(12) United States Patent
Wilson et al.

(10) Patent No.: US 10,569,676 B1
(45) Date of Patent: Feb. 25, 2020

(54) FIXED SEAT DAMPENER

(71) Applicant: GM Global Technology Operations LLC, Detroit, MI (US)

(72) Inventors: Michael K. Wilson, Belleville, MI (US); James F. Szatkowski, Roseville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 16/127,875

(22) Filed: Sep. 11, 2018

(51) Int. Cl.
*B60N 2/427* (2006.01)
*B60N 2/42* (2006.01)
*B60N 2/68* (2006.01)

(52) U.S. Cl.
CPC ....... *B60N 2/42745* (2013.01); *B60N 2/4228* (2013.01); *B60N 2/68* (2013.01)

(58) Field of Classification Search
CPC .............. B60N 2/42745; B60N 2/4228; B60N 2/42736; B60N 2/68
USPC ............................. 297/216.14, 216.19, 216.2
See application file for complete search history.

(56) References Cited

U.S. PATENT DOCUMENTS

| | | | | |
|---|---|---|---|---|
| 2,823,730 A | * | 2/1958 | Lawrence | B60N 2/4221 297/216.2 |
| 3,998,291 A | * | 12/1976 | Davis | B60N 2/4221 180/274 |
| 5,125,598 A | | 6/1992 | Fox | |
| 6,637,822 B1 | * | 10/2003 | Kato | B60N 2/80 297/397 |
| 9,205,768 B2 | | 12/2015 | Jungert et al. | |
| 2002/0089163 A1 | * | 7/2002 | Bedewi | B60R 22/02 280/801.1 |
| 2003/0122407 A1 | * | 7/2003 | Boyd | B60N 2/80 297/130 |
| 2013/0057042 A1 | | 3/2013 | Kortwig et al. | |

FOREIGN PATENT DOCUMENTS

| | | | | |
|---|---|---|---|---|
| CH | 538947 A | * | 7/1973 | ........... B60N 2/4221 |
| FR | 1586051 A | * | 2/1970 | ........... B60N 2/4221 |

* cited by examiner

*Primary Examiner* — Milton Nelson, Jr.
(74) *Attorney, Agent, or Firm* — Vivacqua Law, PLLC

(57) ABSTRACT

A seating system for a vehicle includes a seat frame having a lower part for supporting a posterior and thighs of an occupant and a rear part for supporting the posterior and back of the occupant. The seating system also includes a hinge connecting the seat frame to the vehicle such that, in the event of an impact to the vehicle from the rear of the occupant, the weight of the occupant urges the seat frame to rotate in a direction that results in a top portion of the rear part being urged to move in a rearward direction relative to the occupant. The seating system also includes a first structure fixed to the rear part and configured to cooperate with a second structure fixed to the vehicle to reduce forces transmitted to the occupant in the event of an impact to the vehicle.

17 Claims, 3 Drawing Sheets

FIXED SEAT DAMPENER

INTRODUCTION

The present disclosure relates to a seating system for a transportation vehicle.

Impact to a transportation vehicle may lead to forces being imparted to an occupant seated in the vehicle. In the event of an impact from a direction behind the occupant, the occupant is moved rearward in the seat. Dampening rearward movement of the seat back can reduce the load on the occupant as a result of the impact.

Thus, while current seating systems achieve their intended purpose, there is a need for a new and improved system and method for vehicle seating systems.

SUMMARY

According to several aspects, a seating system for a vehicle includes a seat frame having a lower part for supporting a posterior and thighs of an occupant and a rear part for supporting the posterior and back of the occupant, with the lower part rigidly fixed to the rear part. The seating system also includes a hinge connecting the seat frame to the vehicle such that, in the event of an impact to the vehicle in a direction from the rear of the occupant, the weight of the occupant urges the seat frame to rotate about the hinge axis in a direction that results in a top portion of the rear part being urged to move in a rearward direction relative to the occupant. The seating system further includes a first structure fixed to the rear part, with the first structure configured to cooperate with a second structure fixed to the vehicle to reduce forces transmitted to the occupant in the event of an impact to the vehicle from a direction of the rear of the occupant.

In an additional aspect of the present disclosure, the first structure is a stud mounted to the rear part, and the second structure is a box-shaped structure. A first face of the box-shaped structure defines an opening configured to allow a portion of the stud to protrude into the interior of the box-shaped structure.

In another aspect of the present disclosure, the stud includes a base portion, a stem portion, and a head portion. The stem portion is located axially between the base portion and the head portion, and the base portion is affixed to the rear part of the seat frame.

In yet another aspect of the present disclosure, the opening in the first face is sized so as to allow axial movement of the stem portion of the stud therethrough.

In a further aspect of the present disclosure, the opening of the first face is sized so as to prevent axial movement of the head portion of the stud therethrough.

In another aspect of the present disclosure, a portion of the top of the box-shaped structure adjacent the first face is open, and the opening in the first face extends to the top of the first face.

In an additional aspect of the present disclosure, a layer of an energy-absorbing material is disposed inside the box-shaped structure along the face opposite the first face. The thickness of the layer is selected such that when the stud is minimally protruding into the box-shaped structure the stud does not substantially compress the energy-absorbing material.

In yet another aspect of the present disclosure, the thickness of the layer is such that the stud compresses the energy-absorbing material as the stud protrudes into the box-shaped structure to an extent beyond the minimal protrusion of the stud into the box-shaped structure.

In another aspect of the present disclosure, the energy-absorbing material comprises a viscoelastic material.

In an additional aspect of the present disclosure, the first structure comprises a mount for a first end of a hydraulic damper and wherein the second structure comprises a mount for a second end of the hydraulic damper.

In a further aspect of the present disclosure, the first structure comprises a mount for a first end of a collapsible impact energy absorber and the second structure comprises a mount for a second end of the collapsible impact energy absorber.

In an additional aspect of the present disclosure, the seat frame is part of a seat carriage assembly configured to be installed in the vehicle as a unit.

In a further aspect of the present disclosure, the seat carriage assembly further includes a seat belt.

In an additional aspect of the present disclosure, the seat carriage assembly further comprises a seat belt retractor.

In yet another aspect of the present disclosure, the seat carriage assembly further comprises a seat belt pretensioner.

In a further aspect of the present disclosure, the seat carriage assembly further comprises a garnish.

In another aspect of the present disclosure, a seat is attached to the seat frame such that the seat is removable from the seat frame with the seat frame installed in the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Unless otherwise specified, in the description that follows relative terms such as "front" and "rear" when used to describe directions of impact, movement, forces, and the like, are used with respect to the orientation of an occupant of a vehicle. For example, a "rear" impact refers to an impact from a direction rearward of the occupant. Thus, the term "rear impact" would refer to impact to the rear of the vehicle in the event of a forward-facing occupant seat, an impact to the front of the vehicle in the event of a rear-facing occupant seat, and an impact to a side of the vehicle in the event of a side-facing occupant seat.

Figure 1:
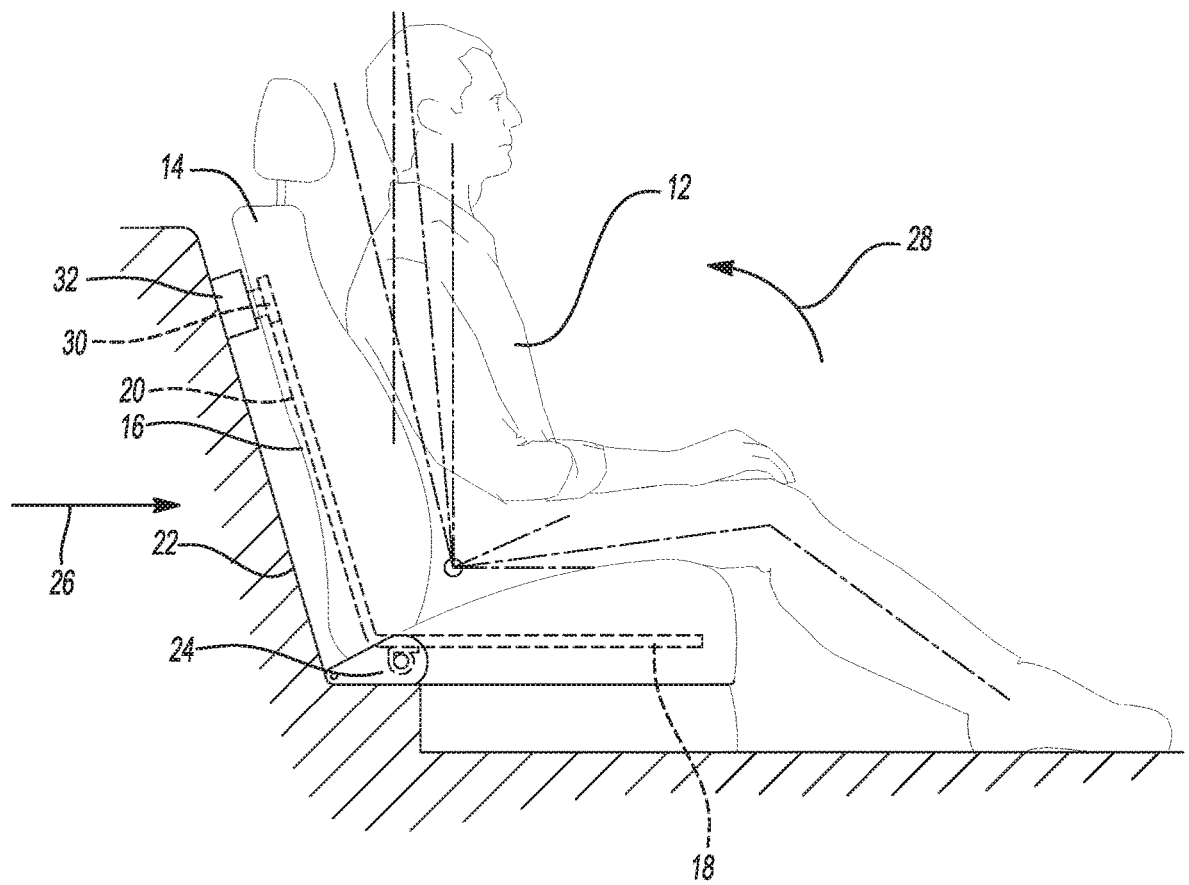
FIG. 1 is a schematic diagram depicting an occupant in a vehicle seat according to an exemplary embodiment.

Referring to FIG. 1, a view from the perspective of the right side of a vehicle occupant is presented. The occupant 12 is depicted sitting on a fixed vehicle seat 14. As used herein, the term "fixed seat" refers to a seating system that does not allow for fore-aft translation of the seat and does not allow for reclining of the seat. The seat 14 is mounted to a seat frame 16 that includes a lower part 18 and a rear part 20. The lower part 18 of the seat frame 16 is for supporting the posterior and thighs of the occupant 12, and the rear part 20 of the seat frame 16 is for supporting the posterior and back of the occupant. The lower part 18 of the seat frame 16 is rigidly fixed to the rear part 20.

With continued reference to FIG. 1, the seat is mounted in a vehicle, portions of which are generally represented as 22. The portions of the vehicle represented by the reference numeral 22 include portions that are generally considered to be fixed in position relative to each other, such as a passenger compartment floor, a vehicle bulkhead, a firewall, and the like. The seat frame 16 is connected to the vehicle 22 by a hinge 24 allowing the seat frame 16 to rotate about a hinge axis. The hinge 24 connects the seat frame 16 to the vehicle 22 such that, in the event of an impact to the vehicle 22 in a direction shown by arrow 26, that is in a direction from the rear of the occupant 12, the weight of the occupant 12 urges the seat frame 16 to rotate about the hinge axis in a direction indicated by arrow 28, such that a top portion of the rear part 20 of the seat frame 16 is urged to move in a rearward direction, rearward being defined relative to the position of the occupant 12. As shown in FIG. 1, a first structure 30 is fixed to the rear part 20 of the seat frame 16, and a second structure 32 is fixed to the vehicle 22. The first structure 30 is configured to cooperate with the second structure 32 to reduce forces transmitted to the occupant 12 in the event of an impact to the vehicle 22 from the direction of the rear of the occupant as indicated by arrow 26.

Figure 2:
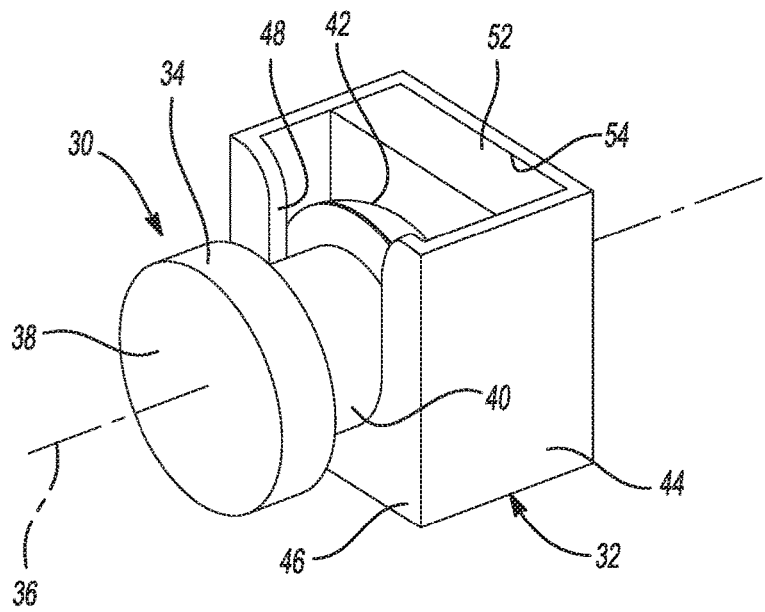
FIG. 2 is a depiction of an energy-absorbing damper according to an exemplary embodiment.
Figure 3A:
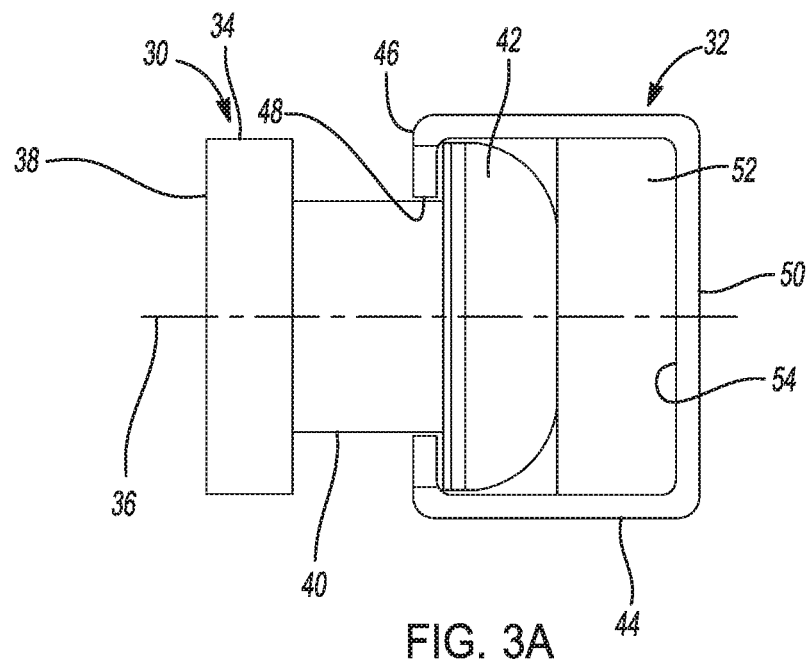
FIG. 3A is a depiction of the damper of FIG. 2 in an uncompressed state according to an exemplary embodiment.
Figure 3B:
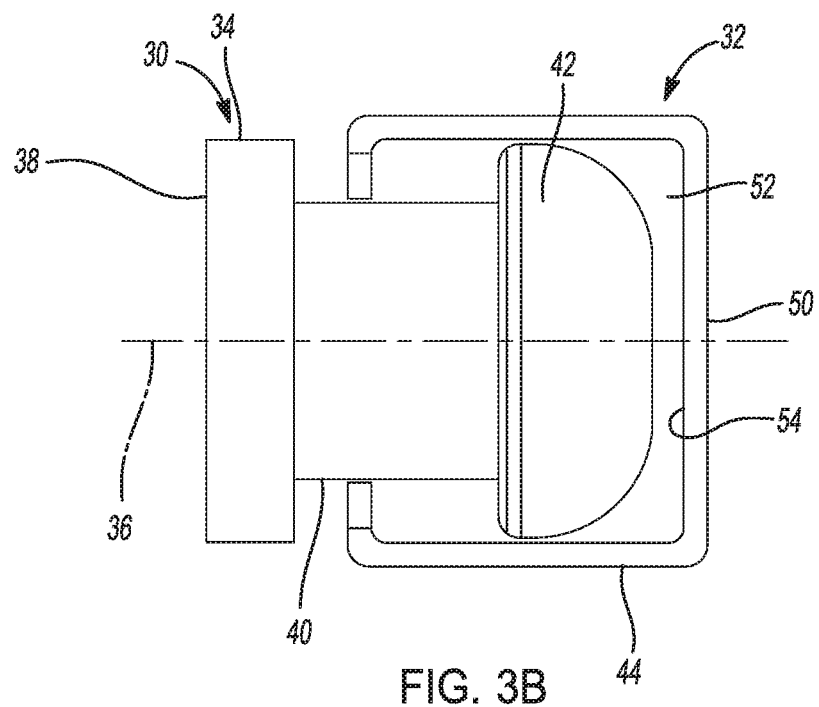
FIG. 3B is a depiction of the damper of FIG. 2 in a compressed state according to an exemplary embodiment.

In the non-limiting exemplary embodiment depicted in FIGS. 2, 3a, and 3b, the first structure 30 comprises a stud 34. As shown in FIGS. 2, 3a, and 3b, the stud 34 is rotationally symmetric about an axis 36 and includes a base portion 38 that is configured to be fixed to the rear part 20 of the seat frame 16. In the exemplary embodiment of FIGS. 2, 3a, and 3b, the stud 34 also includes a stem portion 40 and a head portion 42, with the stem portion 40 located axially between the base portion 38 and the head portion 42.

With continued reference to FIGS. 2, 3a, and 3b, in the depicted embodiment the second structure 32 is a generally box-shaped structure 44. A first face 46 of the box-shaped structure 44 defines an opening 48. A second face 50 disposed opposite the first face 46 of the box-shaped structure 44 is configured to be fixed to a portion of the vehicle 22. At least a portion of the top of the box-shaped structure 44 is open, and the opening 48 in the first face 46 of the box-shaped structure 44 extends to the top of the box-shaped structure 44. The box-shaped structure 44 is thereby configured to receive a portion of the stud 34 and allow a portion of the stud 34 to protrude into the interior of the box-shaped structure 44. In the embodiment depicted in FIGS. 2, 3a, and 3b, the opening 48 defined in the first face is sized so as to allow axial movement of the stem portion 40 of the stud 34 therethrough while prohibiting axial movement of the head portion 42 of the stud 34 therethrough.

With continued reference to FIGS. 2, 3a, and 3b, a layer of an energy-absorbing material 52 is disposed inside the box-shaped structure along the interior 54 of the face 50 opposite the first face 46. The thickness of the layer of energy-absorbing material 52 is chosen such that when the stud 34 is minimally protruding into the box-shaped structure 44, as depicted in FIG. 3a, the stud 34 does not substantially compress the energy-absorbing material 52. The thickness of the layer of energy-absorbing material 52 is chosen such that when the stud 34 protrudes into the box-shaped structure 44 to an extent beyond the minimal protrusion, as depicted in FIG. 3b, the stud 34 compresses the energy-absorbing material 52.

In a first non-limiting embodiment of the present disclosure, the energy-absorbing material 52 comprises an elastomer. As the stud 34 compresses the energy-absorbing material 52, the energy-absorbing material imparts a reaction force against the stud 34, thereby slowing the motion of the seat frame 16, and thereby the motion of the occupant 12, in the direction indicated by the arrow 28 in FIG. 1.

In a second non-limiting embodiment of the present disclosure, the energy-absorbing material 52 comprises a viscoelastic material. As used herein, the term "viscoelastic material" refers to a material that exhibits both viscous and elastic characteristics when undergoing deformation, that is, a material that exhibits time-dependent strain. The viscoelastic material may be chosen to provide advantageous stress-strain characteristics when the energy-absorbing material 52 imparts a reaction force against the stud 34, thereby slowing the motion of the seat frame 16, and thereby the motion of the occupant 12, in the direction indicated by the arrow 28 in FIG. 1.

In an alternative embodiment, the first structure 30 comprises a mount for a first end of a hydraulic damper (not shown), and wherein the second structure 32 comprises a mount for a second end of the hydraulic damper. As used herein, the term "hydraulic damper" refers to a device that resists relative motion between its first end and its second end by way of viscous friction.

In yet another alternative embodiment, the first structure 30 comprises a mount for a first end of a collapsible impact energy absorber (not shown) and the second structure 32 comprises a mount for a second end of the collapsible impact energy absorber. As used herein, the term "collapsible impact energy absorber" refers to a structure that dissipates kinetic energy by plastically deforming one or more solid members.

Figure 4:
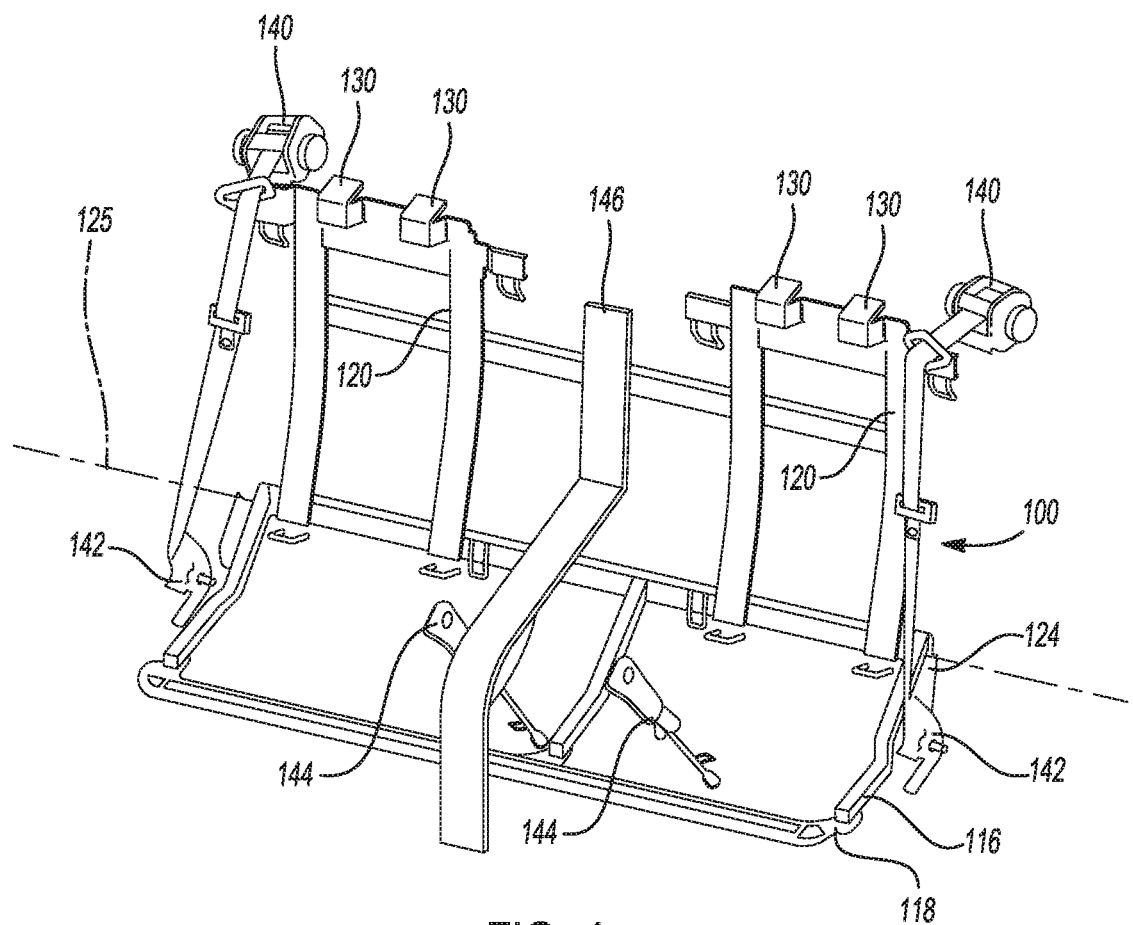
FIG. 4 is a depiction of a seat carriage assembly configured to allow a seating subassembly to be installed in a vehicle in a single operation, according to an exemplary embodiment.

Referring to FIG. 4, a seat carriage assembly 100 includes a seat frame 116 that includes a lower part 118 and at least one rear part 120. The lower part 118 of the seat frame 116 is for supporting the posterior and thighs of an occupant 12 (shown in FIG. 1), and the rear part 120 of the seat frame 116 is for supporting the posterior and back of the occupant 12. The lower part 118 of the seat frame 116 is rigidly fixed to the rear part 120. The seat frame 116 is connectable to the vehicle 22 (shown in FIG. 1) by a hinge 124 allowing the seat frame 116 to rotate about a hinge axis 125. In the event of an impact to the vehicle 22 in a direction shown by arrow 26 in FIG. 1, that is in a direction from the rear of the occupant 12, the weight of the occupant 12 urges the seat frame 116 to rotate about the hinge axis 125 in a direction indicated by arrow 28 (FIG. 1), such that a top portion of the rear part 120 of the seat frame 116 is urged to move in a rearward direction, rearward being defined relative to the position of the occupant. A first structure 130 is fixed to the rear part 120 of the seat frame 116. The first structure 130 is configured to cooperate with a second structure fixed to the vehicle 22 to reduce forces transmitted to the occupant in the event of an impact to the vehicle 22 from the direction of the rear of the occupant as indicated by arrow 26 in FIG. 1. The embodiment shown in FIG. 4 includes a plurality of first structures 130. In an advantageous embodiment, each of the first structures 130 comprises a structure 30 as described relative to FIGS. 2, 3a, and 3b, and each of the first structures 130 cooperates with a corresponding second structure 32 mounted to the vehicle 22, as described relative to FIGS. 2, 3a, and 3b.

With continued reference to FIG. 4, the depicted embodiment of the seat carriage assembly 100 includes a plurality of seat belt retractors 140 fixedly attached to the seat frame 116. The depicted embodiment of the seat carriage assembly further includes a plurality of seat belt pretensioners 142 fixedly attached to the seat frame 116. The depicted embodiment of the seat carriage assembly further includes a plurality of lap belts 144 fixedly attached to the seat frame 116. The seat carriage assembly 100 depicted in FIG. 4 also includes a garnish 146.

Figure 5:
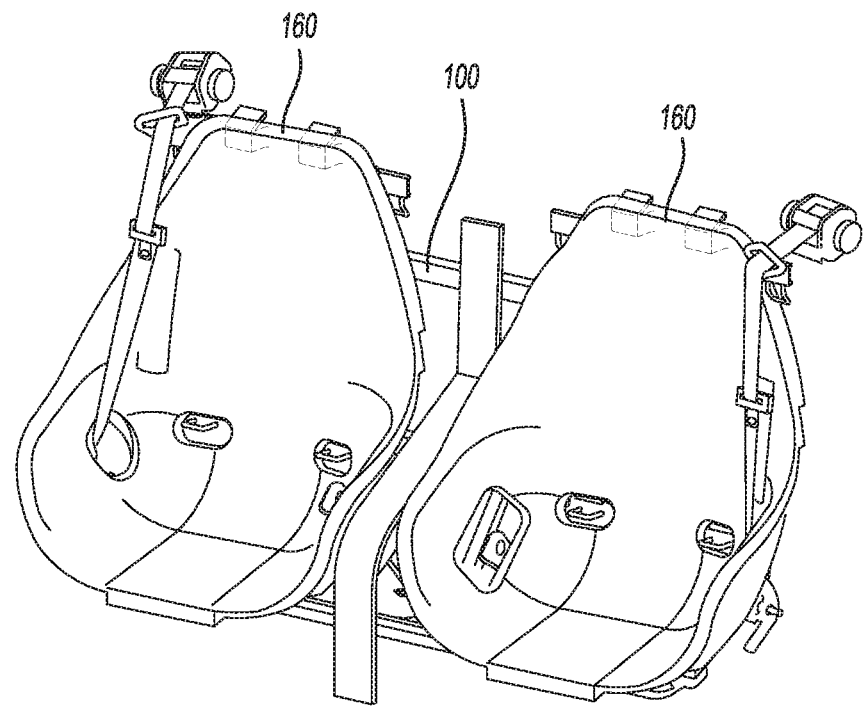
FIG. 5 is a depiction of the seat carriage assembly of FIG. 4 to which seats are installed.

Referring to FIG. 5, the seat carriage assembly 100 as described with reference to FIG. 4 has a plurality of seats 160 attached thereto. In one non-limiting exemplary embodiment, at least one of the seats 160 is attached to the seat carriage assembly 100 using fasteners that are accessible after the seat carriage assembly 100 is installed in a vehicle. With such an arrangement, a seat 160 can be removed to access a portion of the vehicle located under or behind the seat after the seat carriage assembly 100 is installed in the vehicle.

A seating system of the present disclosure offers several advantages. The disclosed seating system allows a fixed seat to be rigid at all times during normal vehicle operation while allowing forces imparted on an occupant of the seat to be reduced in the event of an impact to the vehicle. The discloses seating system allows a fixed seat to be easily removable from the vehicle by lifting the seat frame 16 such that the stud 34 slides up in the opening 48 in the box-shaped structure 44 until the stud 34 is clear of the box-shaped structure 44. The disclosed seat carriage assembly 100 allows the seats 160, along with associated seat belt retractors 140, seat belt pretensioners 142, lap belts 144, and/or garnish 146 to be pre-assembled into a seating assembly outside of the vehicle, thus allowing for fixturing to more accurately locate components and allowing easier assembly due to more workspace around the seating assembly. The completed seating assembly can then be installed in the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seating system for a vehicle, comprising:
    a seat frame comprising a lower part for supporting a posterior and thighs of an occupant and a rear part for supporting the posterior and back of the occupant, the lower part rigidly fixed to the rear part;
    a hinge defining a hinge axis, the hinge connecting the seat frame to the vehicle such that, if an impact to the vehicle occurs in a direction from the rear of the seat frame, the seat frame is urged to rotate about the hinge axis in a direction that results in a top portion of the rear part being urged to move in a rearward direction relative to the seat frame; and
    a first structure fixed to the rear part, the first structure configured to cooperate with a second structure fixed to the vehicle to reduce forces transmitted to the occupant if an impact to the vehicle occurs from a direction of the rear of the seat frame;
    wherein the first structure is a stud mounted to the rear part, and wherein the second structure is a box-shaped structure with a first face of the box-shaped structure defining an opening configured to allow a portion of the stud to protrude into the interior of the box-shaped structure.

2. The seating system of claim 1, wherein a portion of the top of the box-shaped structure adjacent the first face is open, and wherein the opening in the first face extends to the top of the first face.

3. The seating system of claim 2, wherein the stud comprises a base portion, a stem portion, and a head portion, the stem portion located axially between the base portion and the head portion, wherein the base portion is affixed to the rear part of the seat frame.

4. The seating system of claim 3, wherein the opening in the first face is sized so as to allow axial movement of the stem portion of the stud therethrough.

5. The seating system of claim 4, wherein the opening of the first face is sized so as to prevent axial movement of the head portion of the stud therethrough.

6. The seating system of claim 1, wherein a layer of an energy-absorbing material is disposed inside the box-shaped structure along the face opposite the first face, the thickness of the layer such that when the stud is minimally protruding into the box-shaped structure the stud does not substantially compress the energy-absorbing material.

7. The seating system of claim 6, wherein the energy-absorbing material comprises a viscoelastic material.

8. The seating system of claim 6, wherein the thickness of the layer is such that the stud compresses the energy-absorbing material as the stud protrudes into the box-shaped structure to an extent beyond the minimal protrusion of the stud into the box-shaped structure.

9. The seating system of claim 1, wherein the seat frame is part of a seat carriage assembly configured to be installed in the vehicle as a unit.

10. The seating system of claim 9, wherein the seat carriage assembly further comprises a seat belt pretensioner.

11. The seating system of claim 9, wherein the seat carriage assembly further comprises a garnish.

12. The seating system of claim 9, further comprising a seat attached to the seat frame such that the seat is removable from the seat frame with the seat frame installed in the vehicle.

13. The seating system of claim 9, wherein the seat carriage assembly further comprises a seat belt.

14. The seating system of claim 9, wherein the seat carriage assembly further comprises a seat belt retractor.

15. A method of reducing forces imparted on an occupant of a vehicle, the method comprising the steps of:
    providing a seat frame comprising a lower part and a rear part rigidly fixed to the lower part;
    providing a hinge defining a hinge axis, the hinge attaching the seat frame to the vehicle;
    providing a first structure fixed to the rear part of the seat frame;
    providing a second structure fixed to the vehicle;
    wherein the first structure is configured to cooperate with the second structure to absorb energy so as to reduce forces imparted on the occupant if an impact to the vehicle occurs;
    wherein the first structure is a stud mounted to the rear part, and wherein the second structure is a box-shaped structure with a first face of the box-shaped structure defining an opening configured to allow a portion of the stud to protrude into the interior of the box-shaped structure.

16. The method of claim 15, wherein the impact to the vehicle is from a direction of the rear of the seat frame.

17. The method of claim 15 wherein one of the first structure and the second structure contains an energy-absorbing material, and wherein the other of the first structure and the second structure comprises a member configured to compress the energy-absorbing material upon occurrence of the impact to the vehicle.

\* \* \* \* \*